United States Patent [19]
Horsley

[11] Patent Number: 5,376,760
[45] Date of Patent: Dec. 27, 1994

[54] TRUCK LOAD INDICATOR APPARATUS

[76] Inventor: Charles L. Horsley, P.O. Box 1034, Gardnerville, Nev. 89415

[21] Appl. No.: 51,775

[22] Filed: Apr. 26, 1993

[51] Int. Cl.$^5$ .............................................. G01G 19/08
[52] U.S. Cl. ................................................... 177/137
[58] Field of Search .............................. 177/137, 138

[56] References Cited

U.S. PATENT DOCUMENTS

| | | | |
|---|---|---|---|
| 1,147,127 | 7/1915 | Troll | 177/137 |
| 3,092,818 | 6/1963 | Potschka | 177/137 |
| 3,151,692 | 10/1964 | Dysart | 177/137 |
| 3,794,130 | 2/1974 | Malmgren et al. | 177/137 |
| 3,934,663 | 1/1976 | Johansson | 177/137 |
| 4,884,644 | 12/1989 | Reichow | 177/137 |
| 5,161,628 | 11/1992 | Wirth | 177/137 |

Primary Examiner—George H. Miller, Jr.
Attorney, Agent, or Firm—E. Michael Combs

[57] ABSTRACT

A switch structure in association with the leaf spring portion of a truck is arranged to indicate deflection of the spring structure to effect indication of load conditions within the associated truck. An individual or a plurality of indicators may be utilized to indicate various levels of load accommodation of the truck structure in use, having a passenger compartment mounted indicator member utilizing audible and visual indicator components.

4 Claims, 8 Drawing Sheets

FIG. 5
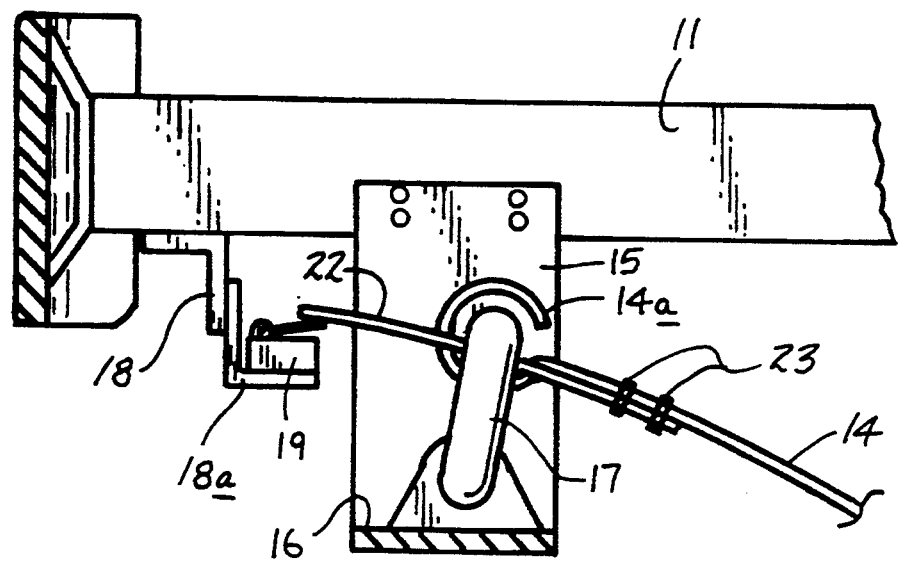
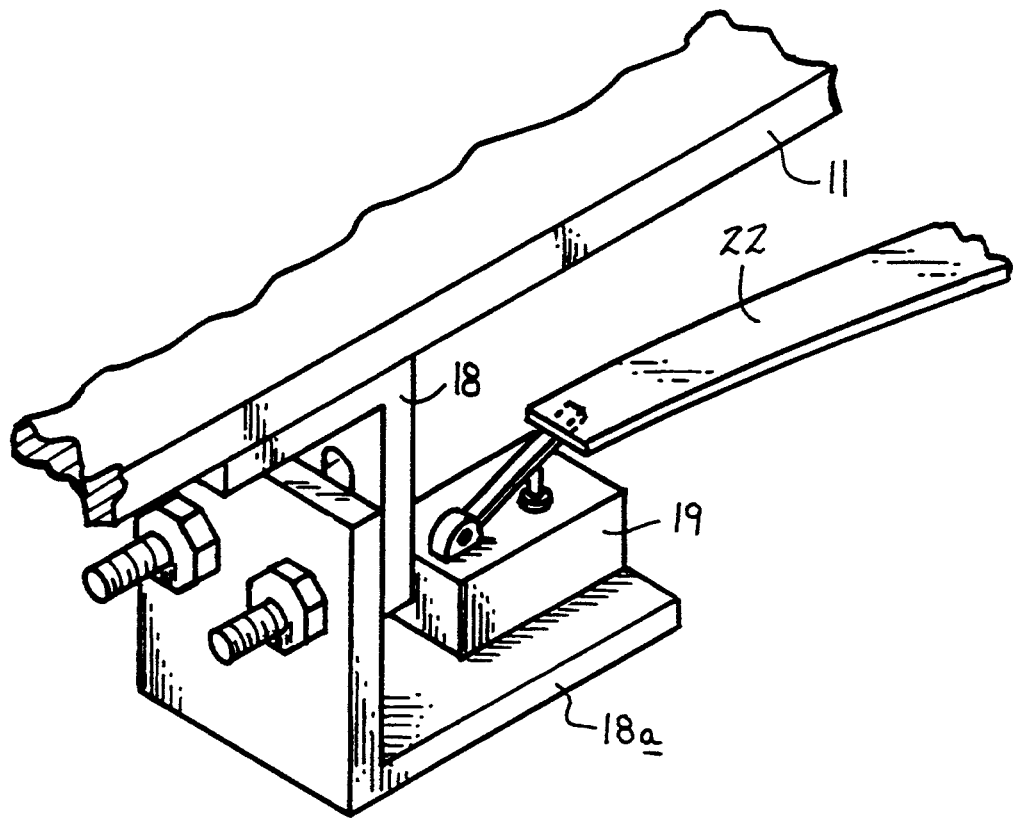
FIG. 6

FIG. 9
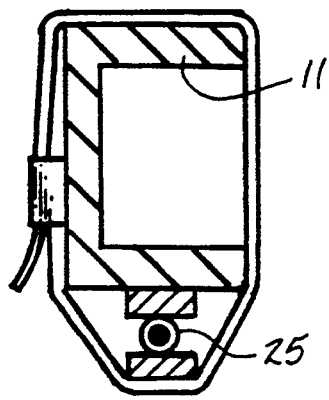
FIG. 10
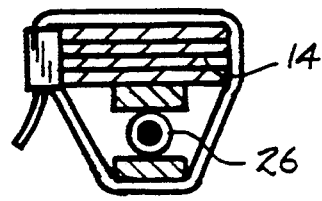
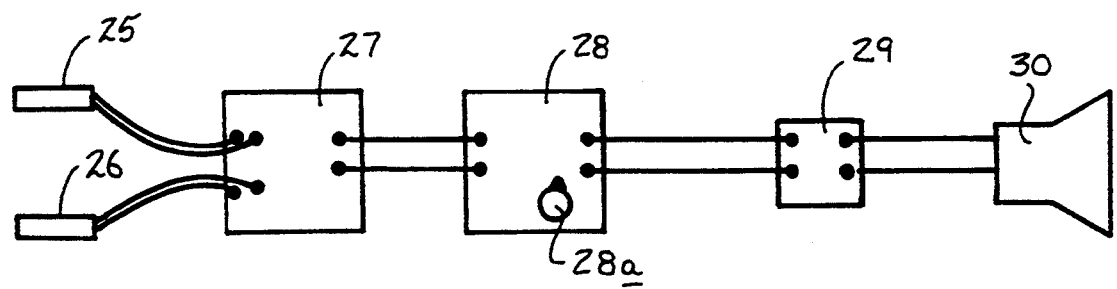
FIG. 11

FIG. 12
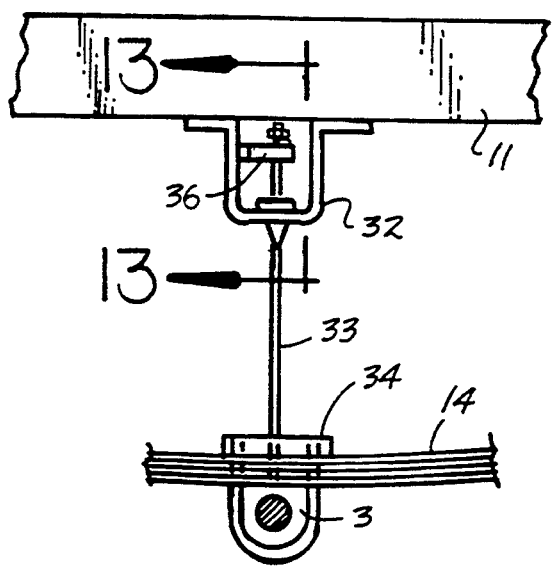
FIG. 13
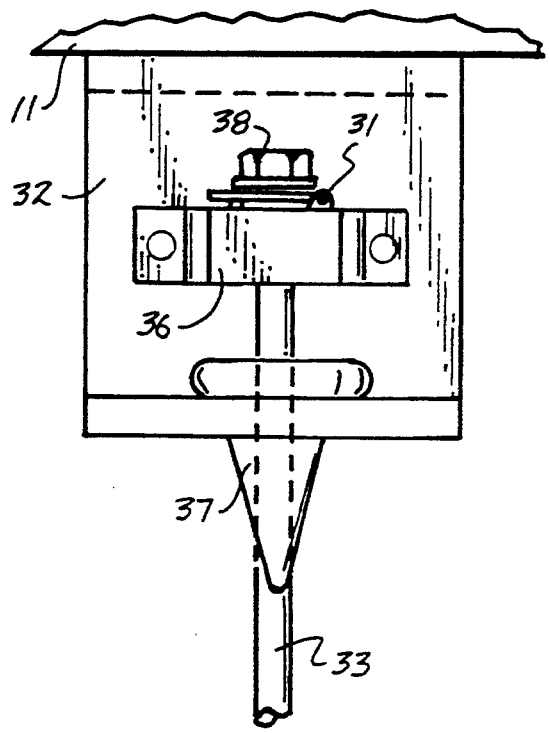
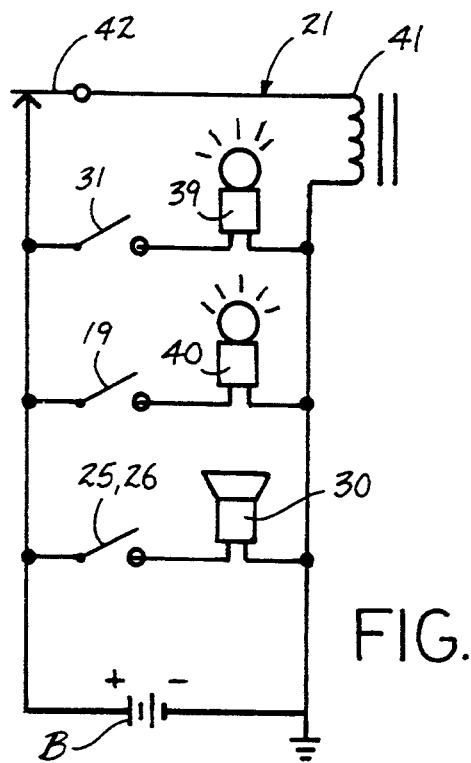
FIG. 14

FIG. 17
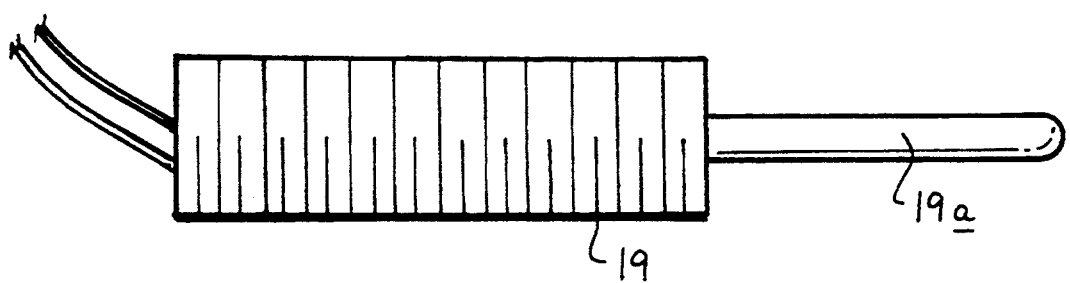
FIG. 18
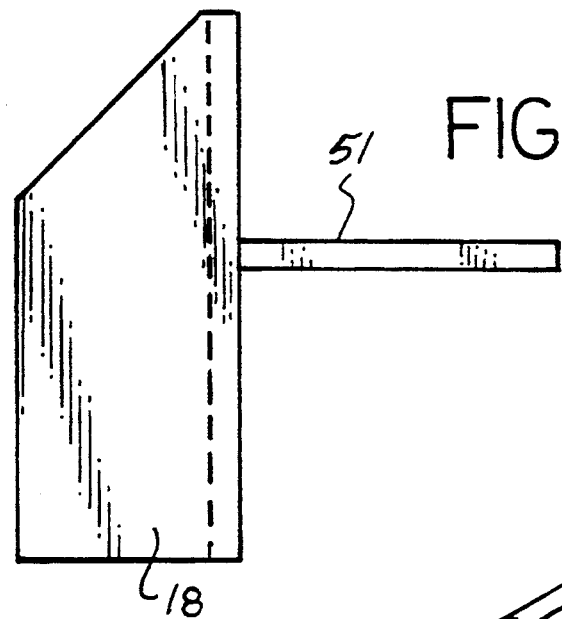
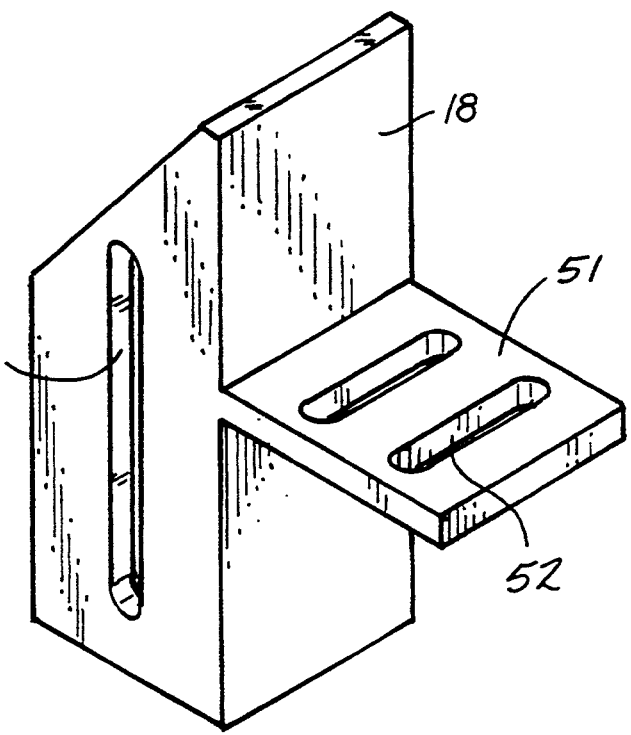
FIG. 19

TRUCK LOAD INDICATOR APPARATUS

BACKGROUND OF THE INVENTION

1. Field of the Invention

The field of invention relates to load indicator apparatus, and more particularly pertains to a new and improved truck load indicator apparatus wherein the same is arranged to indicate loading relative to spring deflection and frame deflection of the associated truck vehicle.

2. Description of the Prior Art

Load indicator structure has been employed in the prior art to indicate relative loading of a truck such as U.S. Pat. No. 4,606,419 to Perini wherein mechanical scale structure is arranged to indicate loading relative to a truck bed and the associated truck axle structure.

U.S. Pat. No. 3,857,452 to Hartman sets forth a dump truck load sensing structure of a pivoting truck.

U.S. Pat. No. 4,266,106; U.S. Pat. No. 4,393,951; and U.S. Pat. No. 4,981,186 are further examples of load indicator structure employed in the prior art.

The instant invention attempts to overcome deficiencies of the prior art by providing for a multi-sensing structure availed to spring load indicating deflection of a truck bed and in this respect, the present invention substantially fulfills this need.

SUMMARY OF THE INVENTION

In view of the foregoing disadvantages inherent in the known types of load indicator apparatus now present in the prior art, the present invention provides a truck load indicator apparatus wherein the same utilizes structure oriented relative to the spring components of the truck. As such, the general purpose of the present invention, which will be described subsequently in greater detail, is to provide a new and improved truck load indicator apparatus which has all the advantages of the prior art load indicator apparatus and none of the disadvantages.

To attain this, the present invention provides a switch structure in association with the leaf spring portion of a truck arranged to indicate deflection of the spring structure to effect indication of load condition within the associated truck. An individual or a plurality of indicators may be utilized to indicate various levels of load accommodation of the truck structure in use, having a passenger compartment mounted indicator member utilizing audible and visual indicator components.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck load indicator apparatus which has all the advantages of the prior art load indicator apparatus and none of the disadvantages.

It is another object of the present invention to provide a new and improved truck load indicator apparatus which may be easily and efficiently manufactured and marketed.

It is a further object of the present invention to provide a new and improved truck load indicator apparatus which is of a durable and reliable construction.

An even further object of the present invention is to provide a new and improved truck load indicator apparatus which is susceptible of a low cost of manufacture with regard to both materials and labor, and which accordingly is then susceptible of low prices of sale to the consuming public, thereby making such truck load indicator apparatus economically available to the buying public.

Still yet another object of the present invention is to provide a new and improved truck load indicator apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic side view of a modified switch sensing structure relative to the spring of the invention.

FIG. 6 is an enlarged isometric illustration of the sensing switch, as indicated in FIG. 5.

FIG. 9 is an orthographic view, taken along the lines 9—9 of FIG. 8 in the direction indicated by the arrows.

FIG. 10 is an orthographic view, taken along the lines 10—10 of FIG. 8 in the direction indicated by the arrows.

FIG. 11 is a diagrammatic illustration of the sensing switch structure of the level sensors as indicated in FIG. 8.

FIG. 12 is an orthographic side view of a further switch structure associated with the axle housing of the invention.

FIG. 13 is an enlarged orthographic view, taken along the lines 13—13 of FIG. 12 in the direction indicated by the arrows.

FIG. 14 is a diagrammatic illustration of a circuit structure arranged for use by the indicator member positioned within the passenger compartment of the truck vehicle.

FIG. 17 is an enlarged orthographic view of the switch member.

FIG. 18 is an enlarged orthographic view of the support flange.

FIG. 19 is an isometric illustration of the support flange.

DESCRIPTION OF THE PREFERRED EMBODIMENT

Figure 1:
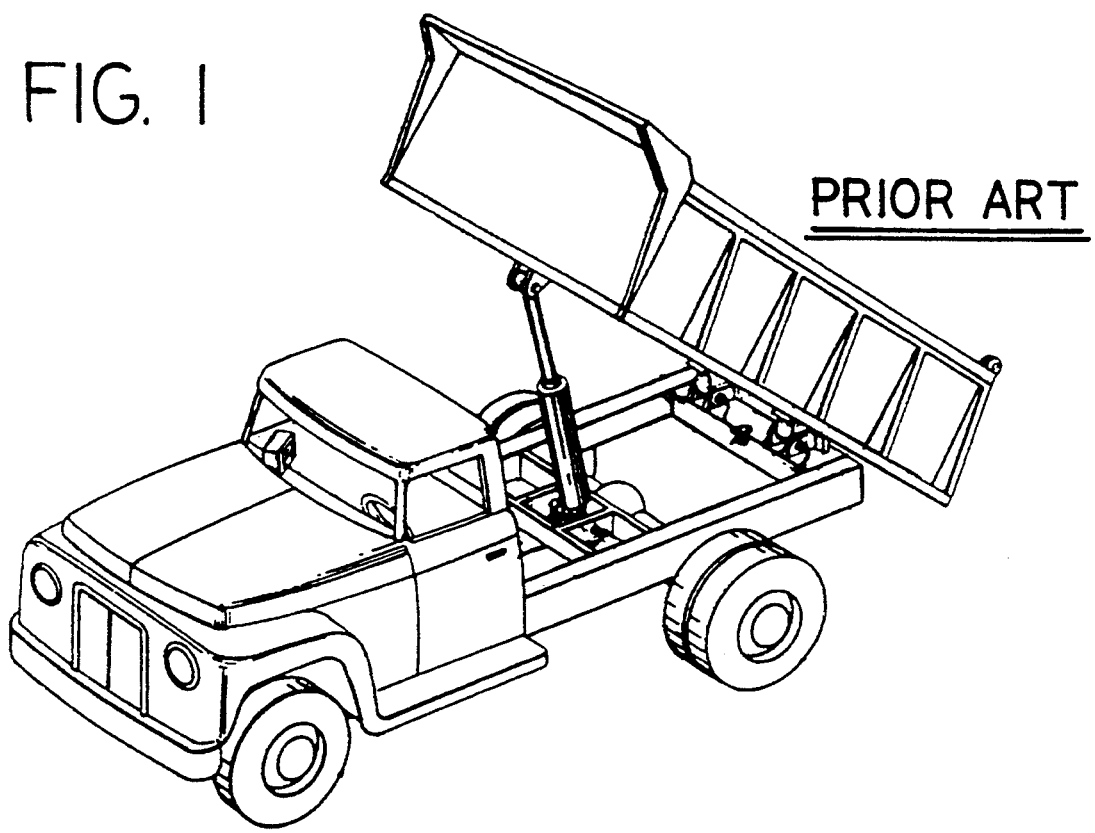
FIG. 1 is an isometric illustration of a prior art pivoting bed truck load sensing structure.
Figure 2:
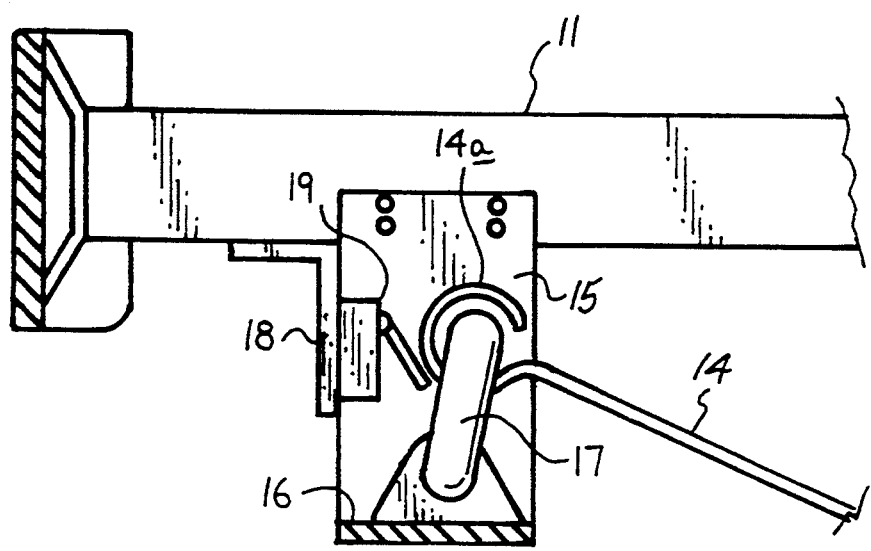
FIG. 2 is an enlarged orthographic side view of an embodiment of the micro-switch structure oriented relative to the spring eye of the spring structure of the truck structure.

With reference now to the drawings, and in particular to FIGS. 1 to 19 thereof, a new and improved truck load indicator apparatus embodying the principles and concepts of the present invention and generally designated by the reference numeral 10 will be described.

The FIG. 1 indicates a prior art dump truck load sensing assembly, as indicated in U.S. Pat. No. 3,857,452 employing orientation of strain gauges to evaluate the weight of loading of the truck bed.

Figure 3:
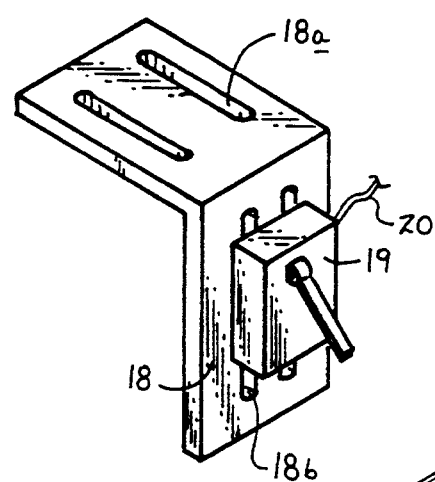
FIG. 3 is an isometric illustration of a mounting bracket arranged for mounting the sensing switch.
Figure 4:
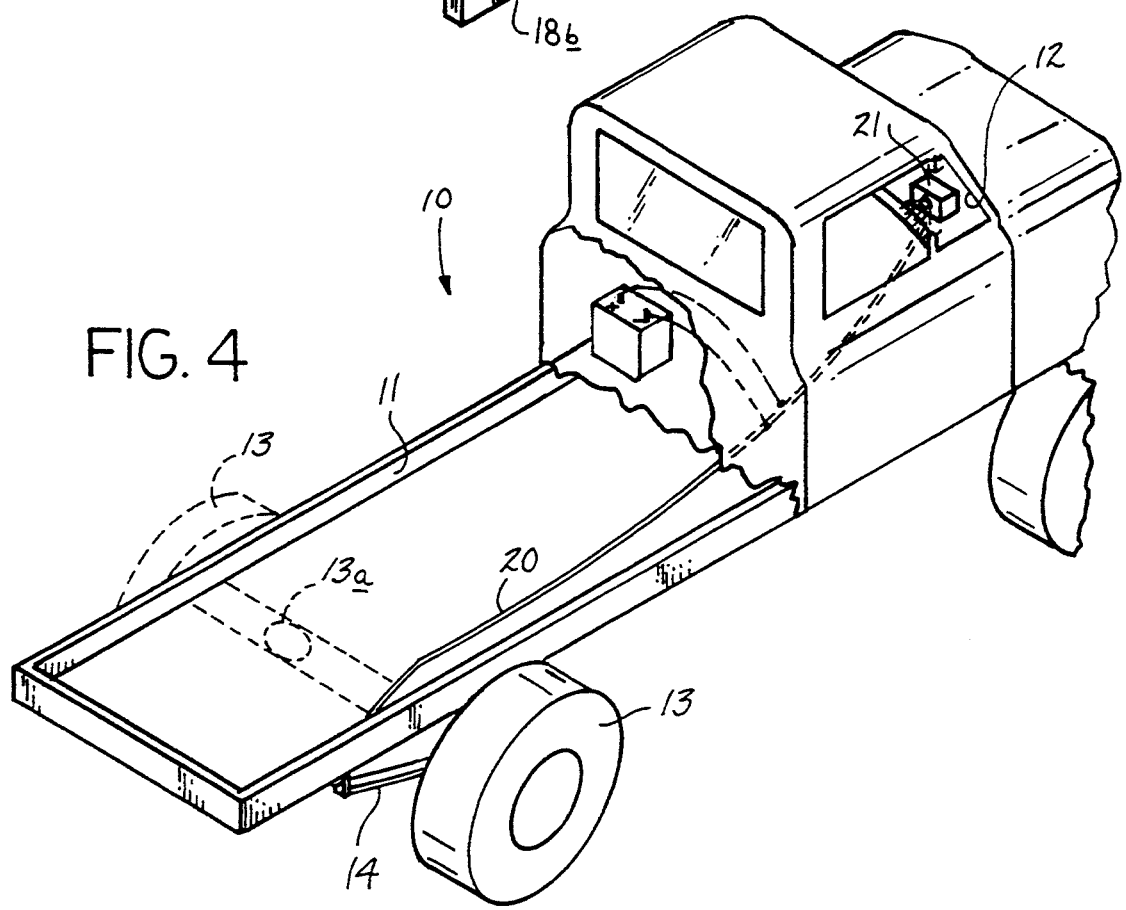
FIG. 4 is an isometric illustration of the invention in association with an associated truck body and chassis.

More specifically, the truck load indicator apparatus 10 of the instant invention essentially comprises a truck assembly, having a frame 11, a passenger compartment 12, and rear wheel members 13 mounted relative to a rear wheel axle 13a, as indicated in FIG. 4. Each of the rear wheel members 13 includes a rear wheel leaf spring member 14 mounted between the truck axle 13a and the frame 11. Each spring member 14 includes a rear spring eye 14a (see FIG. 2), wherein a frame rear spring support flange mounted to the frame extends below the frame and includes a support flange floor plate 16, that in turn mounts a spring shackle 17 that in turn secures the spring eye 14a thereto. An L-shaped switch support flange 18 mounted to the frame 11 adjacent the rear spring support flange 15 is arranged to include a switch member 19 mounted to the L-shaped switch support flange 18, whereupon deflection of the spring eye 14a effects contact with the switch 18 for indication within an indicator member 21 mounted within the passenger compartment 12 of the associated truck member. Electric cable construction 20 electrically communicates the indicator member 21 with the switch member 19. Further it should be noted, as indicated in FIG. 3, that respective first and second slots 18a and 18b orthogonally oriented relative to one another permit adjustment of the L-shaped support flange 18 to the frame 11 and the switch 19 to the support flange 18.

Figure 7:
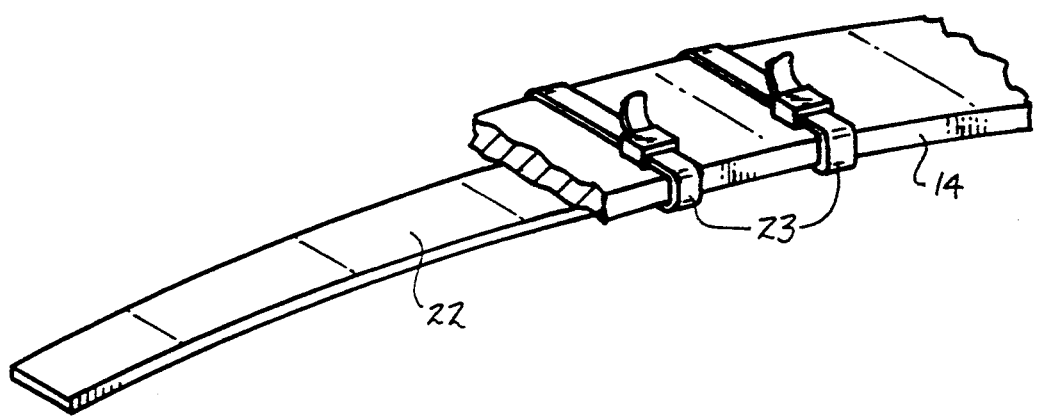
FIG. 7 is an isometric illustration of the extension plate employed by the spring structure as utilized in the organization of FIGS. 5 and 6.

In the FIGS. 5-7, the rear leaf spring member 14 is indicated to include an extension plate 22 mounted to the spring leaf member extending beyond the spring eye 14 to employ securement bands 23 for mounting the extension plate 22 to the rear leaf spring member 14. A second L-shaped switch support flange 18a secured to the L-shaped switch support flange 18 mounts the switch member 19 in adjacency to a free distal end of the extension plate 22, whereupon deflection of the spring 14 effects engaging the switch 19 by the extension plate 22, as indicated in the FIGS. 5 and 6 for example.

Figure 8:
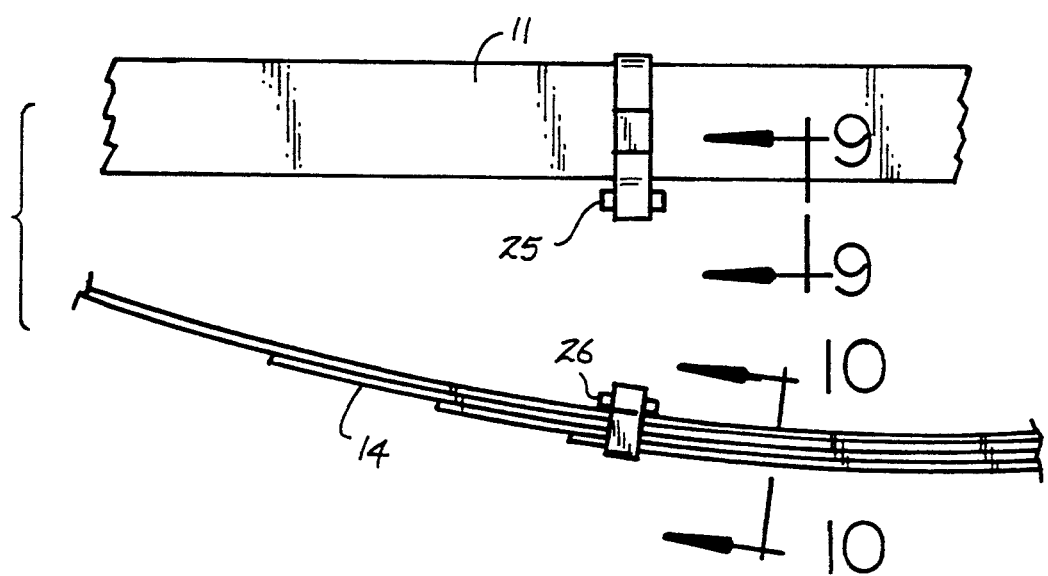
FIG. 8 is an orthographic side view of further level switch structure employed by the invention.

Further, the FIGS. 8-10 indicate the use of a first mercury level switch 25 mounted to the frame 11 in facing relationship to a second mercury level switch 26 mounted to the spring member 14. In this manner, partial tilting with the frame 11 and the spring member 14 is indicated onto an audio speaker 30, as indicated in FIG. 14, in association with the indicator switch member 21. The audio speaker 30 (see FIG. 11) is operative through a signal amplifier 27 and a differentiating amplifier 28. If the truck is empty in a parked level orientation, the control dial 28a is adjusted for no audio output to the speaker 30 through the differentiating amplifier 28 and the square wave generator 29 in operative association with the speaker 30. As a truck is loaded with various materials, the differential amplifier will be able to differentiate between a no-load level orientation and a loaded unlevel orientation of the associated chassis of the truck structure. Further, when a truck is in a loaded orientation and weighted, the exact weight may be oriented relative to the dial 28a to calibrating the dial relative to the loading.

A third level switch 31 is arranged and mounted to a third level switch bracket 32, that in turn is secured to the frame 11. A level rod 33 is slidably directed through the third level switch bracket 32, with the level rod 33 substantially oriented orthogonally relative to the frame 11 and mounted to the truck axle 13a. An axle housing mounting bracket 34 fixedly secures the level rod 33 to the truck axle 13a and a third switch second bracket 36 mounted to the third level switch brackets 32 slidably mounts the third switch 31 thereto, wherein the third switch 31 in operative communication with the rod head 38 at an upper distal end of level rod 33. A resilient guide bushing 37 slidably directs the level rod 33 through the third level switch bracket 32 and the third level switch second bracket 36. The FIG. 14 indicates that a first indicator bulb 39 is arranged in operative communication with the third level switch 31, with a second indicator bulb 40 arranged in operative communication with the switch member 19. A relay coil 41 operative through a normally closed control switch 42 of the indicator member 21 provides for electric communication between the battery "B" and the various switch components for indication of various load conditions within the truck passenger compartment 12.

Figure 15:
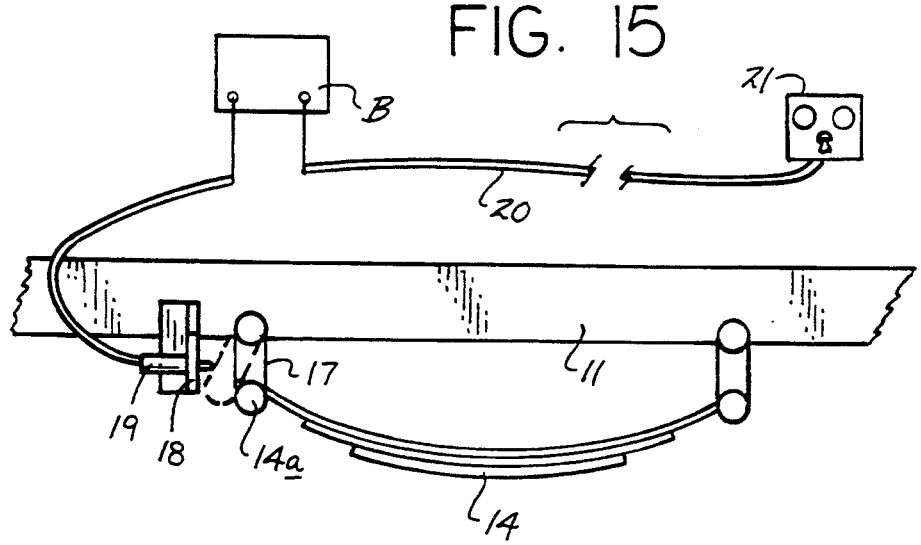
FIG. 15 is an isometric illustration of the invention having the switch member directed through the support flange in a facing relationship relative to the spring shackle structure.
Figure 16:
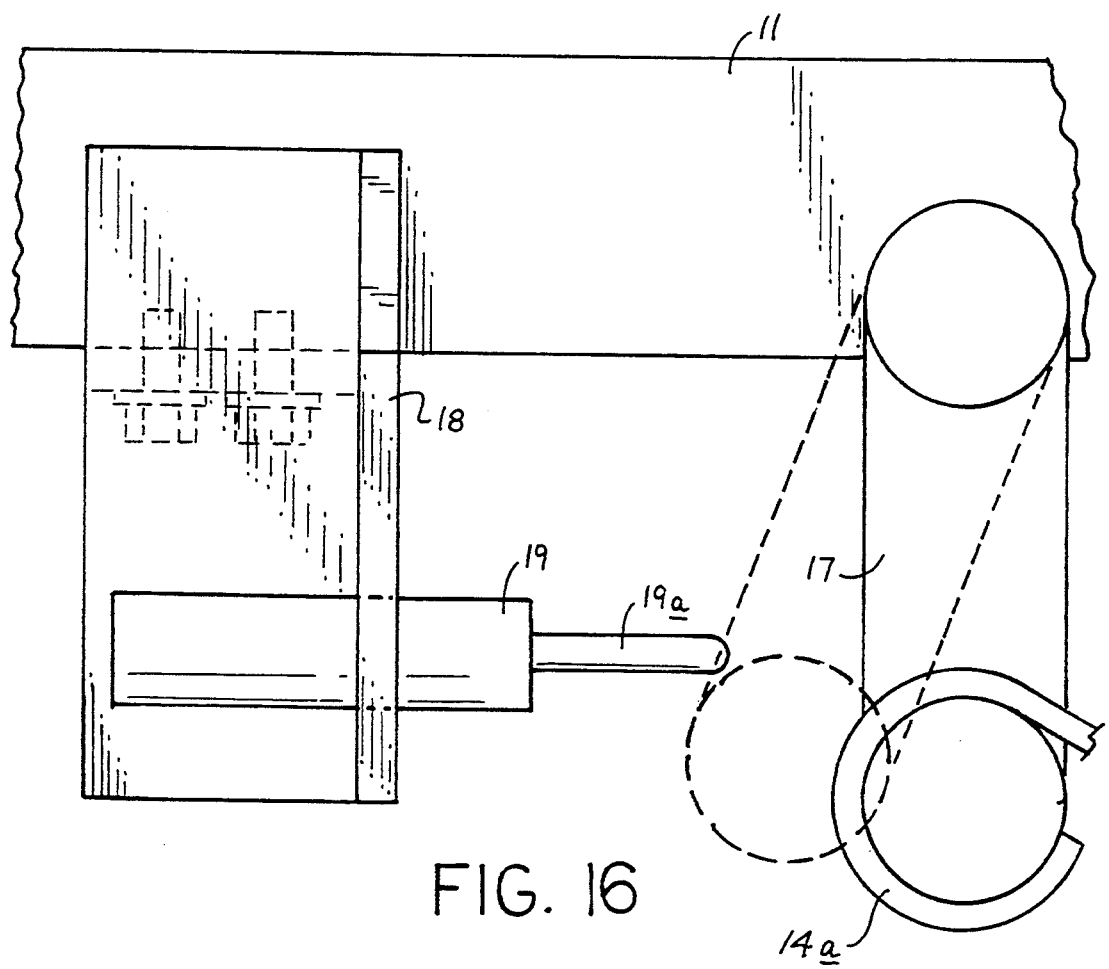
FIG. 16 is an enlarged orthographic view of the switch member oriented relative to the spring shackle.

In typical construction of the organization, it is mounted relative to a conventional pickup truck such as a one-half ton, a three-quarter ton, or one ton mounting of the spring structure relative to the pickup truck's frame 11. To this end, the spring 14 and the support 17 when deflected are directed into engagement with the projecting rod 19a of the switch member 19 mounted within the support flange 18. As illustrated in FIGS. 18 and 19, the support flange includes a mounting flange 51 orthogonally mounted to the support flange for securement to the framework of the truck frame by conventional fasteners, as illustrated in phantom in FIG. 16. The mounting flange 51 includes a plurality of mounting flange slots 52, each of which to receive an individual fastener and in this manner permitting adjustment of the support flange relative to the spring shackle. Further, the switch body 19 is positioned within a switch receiving slot 40 that is orthogonally oriented relative to the mounting flange 51 to permit longitudinal adjustment of the switch member when projecting through the support flange, as illustrated in FIG. 16. A battery "B" operative through the signal indicator and on/off switch structure 21, as illustrated in FIG. 15, permits visual indication of predetermined load deflection of the spring, in a manner as described above. It should be further noted that the switch body 19, as illustrated in FIG. 17, is externally threaded that in turn may employ conventional fasteners positioned on opposed sides of the support flange 18 when the switch is directed through the slot 40.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck load indicator apparatus, comprising,
a truck having a truck frame and a passenger compartment mounted to the frame,
and
a truck axle, the truck axle including a plurality of rear wheel members mounted to the truck axle, and the axle having at least one rear leaf spring member mounting the truck axle to the truck frame, with the rear leaf spring member including a spring eye, the truck frame having a rear spring support flange mounted to the truck frame, and the rear spring support flange having a floor plate, the floor plate having a spring shackle pivotally mounted to the floor plate, with the spring eye mounted to the spring shackle,
and
an L-shaped switch support flange mounted to the truck frame in adjacency to the spring eye and in a spaced relationship relative to the spring eye, with the L-shaped switch support flange having a switch member mounted relative to the L-shaped switch support flange, and the switch member arranged for sensing rotation of the spring eye relative to the spring shackle.

2. An apparatus as set forth in claim 1 wherein the rear leaf spring member includes an extension plate mounted to the spring member, and the extension plate extends beyond the rear spring support flange, with the extension plate positioned in adjacency relative to the switch member, and the L-shaped switch support flange having first slots arranged for adjustment relative to the truck frame, and second slots orthogonally oriented relative to the first slots, with a second support flange mounted to the L-shaped support flange and the second slots, with the switch member mounted to the second support flange in adjacency to a free distal end of the extension plate.

3. An apparatus as set forth in claim 2 wherein the truck frame includes a first mercury level switch mounted between the truck frame and the rear leaf spring member, and a second mercury level switch mounted to the spring member, and the first mercury level switch and the second mercury level switch electrical communication with the signal amplifier, and the signal amplifier in electrical communication with the differentiating amplifier, and a square wave generator mounted in electrical communication with the differentiating amplifier, and an audio speaker mounted in electrical communication with the square wave generator, whereupon displacement of the first mercury level switch and the second mercury level switch selectively effects actuation of the audio speaker.

4. An apparatus as set forth in claim 3 including a level rod, the level rod including an axle housing bracket fixedly mounted to the level rod to the truck axle, and the level rod oriented intermediate the truck frame and the truck axle, with the level rod orthogonally oriented relative to the truck frame, and a third switch member bracket mounted to the truck frame slidably receiving the level rod therethrough, and a third switch second bracket mounted to the third level switch bracket, with the third level switch second bracket slidably receiving the lever rod therethrough, and the level rod having a rod head at a free distal end of the level rod spaced from the truck axle, and a third switch member mounted to the third switch second bracket intermediate the rod head and the third switch second bracket, and illumination means in electrical communication with the third switch second bracket for effecting visual indication of displacement of the truck axle relative to the truck frame.

* * * * *